US006976119B2

(12) United States Patent
Qureshi et al.

(10) Patent No.: US 6,976,119 B2
(45) Date of Patent: Dec. 13, 2005

(54) METHOD AND SYSTEM FOR PROVIDING A LOCATION OF A DATA INTERFACE

(75) Inventors: Shiraz Ali Qureshi, Roseville, CA (US); Martin O. Nicholes, Antelope, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 346 days.

(21) Appl. No.: 10/173,331

(22) Filed: Jun. 14, 2002

(65) Prior Publication Data

US 2003/0233174 A1 Dec. 18, 2003

(51) Int. Cl.[7] .............................................. G06F 12/00
(52) U.S. Cl. ........................... 711/104; 711/102; 713/1
(58) Field of Search ....................... 711/102, 154, 104; 713/1, 2

(56) References Cited

U.S. PATENT DOCUMENTS 5,903,894 A 5/1999 Reneris
5,909,592 A 6/1999 Shipman
5,999,730 A 12/1999 Lewis
6,061,745 A 5/2000 Mahmoud
6,081,890 A * 6/2000 Datta ........................... 713/1
6,167,511 A * 12/2000 Lewis .......................... 713/2
6,167,512 A 12/2000 Tran
6,263,378 B1 7/2001 Rudoff et al.
6,721,881 B1 * 4/2004 Bian et al. ..................... 713/1
6,772,330 B2 * 8/2004 Merkin .......................... 713/2
2003/0009654 A1 * 1/2003 Nalawadi et al. .............. 713/1
2003/0041271 A1 * 2/2003 Nalawadi et al. ........... 713/300

FOREIGN PATENT DOCUMENTS

EP 1357475 A1 10/2003

* cited by examiner

*Primary Examiner*—Hong Chong Kim
*Assistant Examiner*—Shane Thomas

(57) ABSTRACT

A method of passing a location of a data interface. The method involves storing a first pointer in an architected location for locating information related to a system firmware read only memory (ROM). A portion of memory is allocated for a data structure that is an interface for handing off system component information. A second pointer is stored in a memory location pointed to by the first pointer. The second pointer points to the data structure.

18 Claims, 8 Drawing Sheets

METHOD AND SYSTEM FOR PROVIDING A LOCATION OF A DATA INTERFACE

TECHNICAL FIELD

The present invention relates to the field of computer systems. Specifically, the present invention relates to a method and system for passing the location of a data structure to an advanced configuration and power interface (ACPI).

BACKGROUND ART

Advanced Configuration and Power Interface (ACPI) is a specification that makes hardware status information available to an operating system in computers including laptops, desktop, servers, etc. The ACPI also allows hardware resources to be manipulated. For example, ACPI assists in power management by allowing a computer system's peripherals to be powered on and off for improved power management. ACPI also allows the computer system to be turned on and off by external devices. For example, the touch of a mouse or the press of a key may wake up the computer system using ACPI.

Traditionally ACPI has been difficult to work with for a variety of reasons. First, ACPI is not written in the native assembly language of the computer system platform. Instead, ACPI has its own source and machine languages, ACPI Source Language (ASL) and ACPI Machine Language (AML), respectively. Because of its highly specialized use, there are relatively few ASL programmers. Furthermore, ASL has relatively few constructs because of its limited use. Furthermore, ACPI code is conventionally monolithic in its design. Consequently, this makes it difficult to port the ACPI code to other platforms or even to different configurations of the same platform. Thus, new ASL code needs to be written to work with different platforms. The limited number of ASL programmers makes writing new code all the more problematic and costly.

ACPI is composed of both static and interpretable tables. At bootup time, the system firmware constructs the static tables, which are consumed by the operating system. The interpretable tables are composed of AML. The AML is compiled and then merged into the system firmware. The operating system reads the AML from the interpretable tables and executes the architected interfaces, using an ACPI interpreter. In this fashion, the operating system manipulates hardware resources. Because the interpretable tables are merged into the system firmware, this conventional method lacks flexibility, scalability, and requires considerable time to re-program to accommodate various system configurations.

For example, conventionally developers write ACPI code to specify a particular configuration of a platform or its variance. Unfortunately, if even a minor hardware change is performed the design has to be modified. This requires that new AML code to be written and new tables to be merged into the system firmware. Thus, the conventional design is not portable or re-usable.

Furthermore, conventionally ACPI has required that a different system firmware ROM (Read Only Memory) or BIOS (Basic Input Output System) be used if there is a variance of the platform or if it supports more than one ACPI aware OS systems that have mutually exclusive ACPI requirements. A different system firmware ROM also had to be used if the same system is to support multiple operating systems.

Thus, one problem with conventional methods and systems for providing component information at run time is the difficulty in porting code to a different platform. Another problem with such methods and systems is the difficulty in porting code to a different configuration in the same platform. Another problem with such conventional methods and systems is that they are not very scalable. A still further problem is the additional development cost spent writing and testing new ASL code.

DISCLOSURE OF THE INVENTION

The present invention pertains to a method of passing a location of a data interface. The method involves storing a first pointer in an architected location for locating information related to a system firmware read only memory (ROM). A portion of memory is allocated for a data structure that is an interface for handing off system component information. A second pointer is stored in a memory location pointed to by the first pointer. The second pointer points to the data structure.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
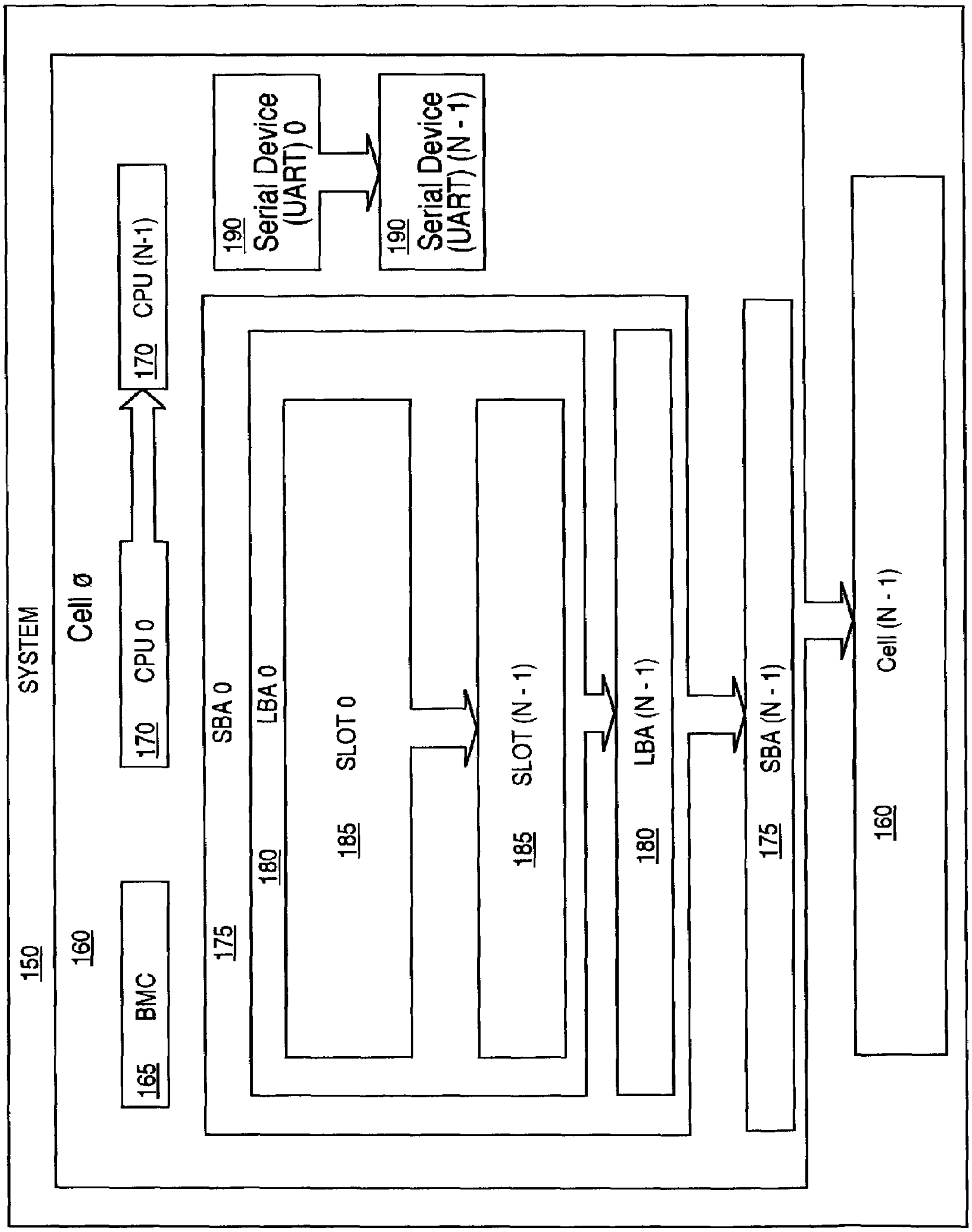
FIG. 1A is a logical configuration of an exemplary computer system, which embodiments of the present invention represent in a data interface.

In the following detailed description of the present invention, a method and device for providing computer system data, numerous specific details are set forth in order to provide a thorough understanding of the present invention. However, the present invention may be practiced without these specific details or by using alternate elements or methods. In other instances well known methods, procedures, components, and circuits have not been described in detail as not to unnecessarily obscure aspects of the present invention.

An embodiment of the present invention is a method of passing the location of a data interface to an advanced configuration and power interface (ACPI). The method involves determining an identifier for a first memory location that may be an architected location for locating information related to a system firmware read only memory (ROM). For example, the identifier may be a component type and the memory location may be an entry in a firmware interface table (FIT) for the component type. A first pointer is stored in the first memory location. For example, when the ROM that contains the FIT is built, the pointer may be made a part of the FIT. System firmware may store a second pointer in a second memory location pointed to by the first pointer, at system bootup. The second pointer points to a data structure that is for handing off system component information between the system firmware and the advanced configuration and power interface. ACPI may use the component type identifier to search the FIT table for the first pointer and use that to access the second pointer to locate the data interface. Thus, the size and location of the data interface is flexible.

Embodiments of the present invention are portable between computer system platforms. Furthermore, embodiments of the present invention are portable between various configurations of the same platform. Embodiments of the present invention are scalable. Embodiments of the present invention save development cost by avoiding costly re-writing of ASL code and modifications to system firmware ROM.

An embodiment of the present invention is an interface for providing data related to computer system components. The interface may be between a system abstraction layer (SAL) and an advanced configuration and power interface (ACPI). The interface may comprise a data structure stored on a computer readable medium. The data structure may be built by SAL when the computer system is booted, for example. The data structure may have a hierarchical schema with fields for component data pertaining to components of a computer system. There may be identifiers for locating the component data in the data structure and the identification process may be aided by specifying the type of component for which information is sought. The scheme of the identifiers may be common between the two programs. The data structure is available to be populated by a first program (e.g., SAL) filling in component data using the identifiers. The component data is accessible by a second program (e.g., ACPI) indexing the data structure with the identifiers. In this fashion, the interface is provided between the first program and the second program. The second program (e.g., ACPI) may reformat the data before sending it to an operating system, which requested system information via a method call, for example.

Figure 1B:
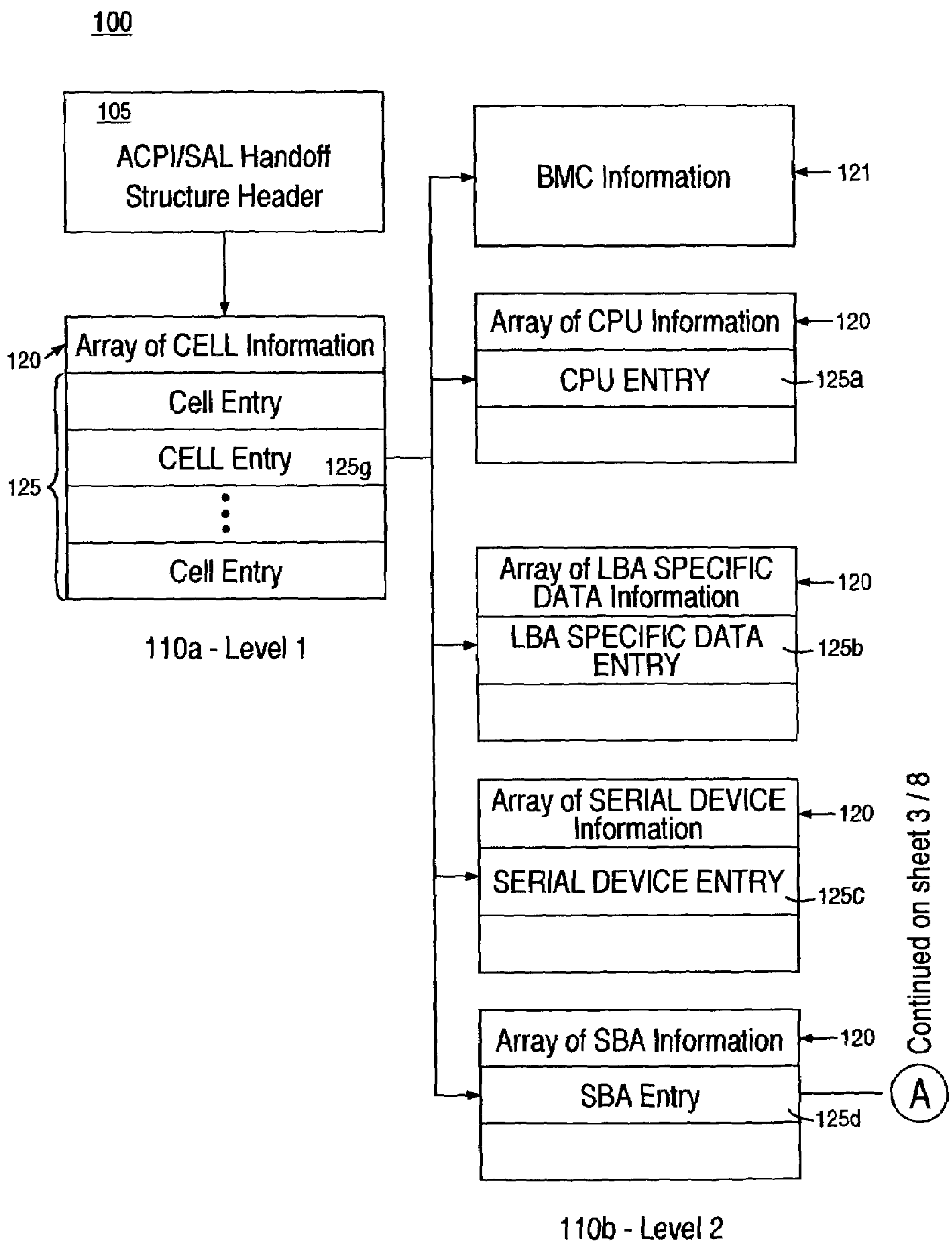
FIG. 1B is a diagram of a data structure for an interface for handing off component information, according to an embodiment of the present invention.

FIG. 1A illustrates a logical configuration of an exemplary computer system 150. Embodiments of the present invention may construct a logical representation of such a system 150 in a data structure interface for handing off computer system 150 component information. FIG. 1B illustrates an exemplary data structure interface that reflects a logical configuration of an exemplary computer system. Embodiments of the present invention construct the data structure interface at system bootup without any prior knowledge of what components will be present upon bootup. Thus, embodiments of the present invention adapt to the particular computer system 150 configuration that is present at bootup.

Referring again to FIG. 1A, the exemplary computer system 150 may comprise one or more cells 160, which may also be referred to as system boards. A cell 160 may have a base management controller (BMC) 160, a number of central processing units (CPUs) 170, and a number of serial devices (e.g., Universal Asynchronous Receiver-Transmitters or UARTs) 190. A cell 160 may also have a number of system bus adapters (SBA) 175, each of which may have a number of a local bus adapters (LBA) 180. Finally, each LBA 180 may have a number of slots 185. FIG. 1A is only exemplary. Not all of the components will always be present and sometimes other types of components will be in the computer system 150. Embodiments of the present invention accurately adapt to whatever configuration is present, without the need to re-write ACPI code.

FIG. 1B illustrates an exemplary data structure 100 (e.g., a handoff structure) that may serve as an interface between two computer programs such that system component information may be passed from one program to the other. For example, one program may fill the handoff structure 100 and the other program may consume the data. The handoff structure 100 may comprise a hierarchical schema that stores information regarding components in the system. The handoff structure 100 may comprise a header 105 for information such as, metadata, signatures, etc. The header is referred to as an ACPI/SAL handoff structure header, as this embodiment of the present invention provides an interface between ACPI and SAL.

The schema may be divided into a number of levels 110. Each level 110 may contain information related to one or more types of components. Referring to level one 110*a*, the only type of component at level one 110*a* is a cell. In this example, the information comprises an array 120 of cell entries 125. Level two 110*b* contains information for five different types of components. The base management controller (BMC) information 121 is not organized as an array 120 of entries 125 because there is only one base management controller, in this example. The information for the other components is organized as arrays 120 of zero or more entries 125, in this example. However, the organization for any component type may be an array 120 or a single entry to provide a flexible solution. Level two 110*b* also contains a central processing unit (CPU) array 120, a local bus adapter (LBA) specific data array 120, a serial device array 120, and a system bus adapter (SBA) array 120. These arrays 120 are exemplary. For example, level two 110*b* may also include other component information, such as an array for UART information.

Still referring to FIG. 1B, the third level 110*c* contains information for a single component type, that being an array 120 of entries 125 for local bus adapters (LBA). Finally, the fourth level 110*d* contains an array 120 of entries 125 for slots.

Various entries 125 in the handoff structure 100 may be linked to other entries 125. For example, one of the cell entries 125 is linked to the BMC information 121, a central processing unit (CPU) entry 125*a*, LBA specific data entry 125*b*, a serial device entry 125*c*, and a system bus adapter (SBA) entry 125*d*. The cell entry 125*g* may link to multiple entries 125 of one or more of the component types, if that reflects that logical configuration of the system. For example, as the computer system is configured, a cell may have multiple SBA's. Proceeding to the third level 110*c* and fourth level 110*d*, the SBA entry 125*d* is linked to an LBA entry 125*e*, which is linked to a slot entry 125*f*. The SBA entry 125*d* may link to multiple LBA entries 125*e* and LBA entry 125*e* may link to multiple slot entries 125*f*.

The handoff structure 100 may contain chipset-specific information, in one embodiment. In this fashion, specific parameter values may be passed to the AML implementation for each chipset. (AML may be an ultimate consumer of data in the handoff structure 100). For example, the AML implementation might support chipsets X, Y, and Z. In this case, the handoff structure 100 may contain a data structure for each of the three supported chipsets, with each data structure containing parameter values needed by AML for the chipset. For example, this may be stored in the array 120 of LBA specific data information 120. Thus, embodiments of the present invention enable an AML implementation supporting multiple chipsets.

Figure 2:
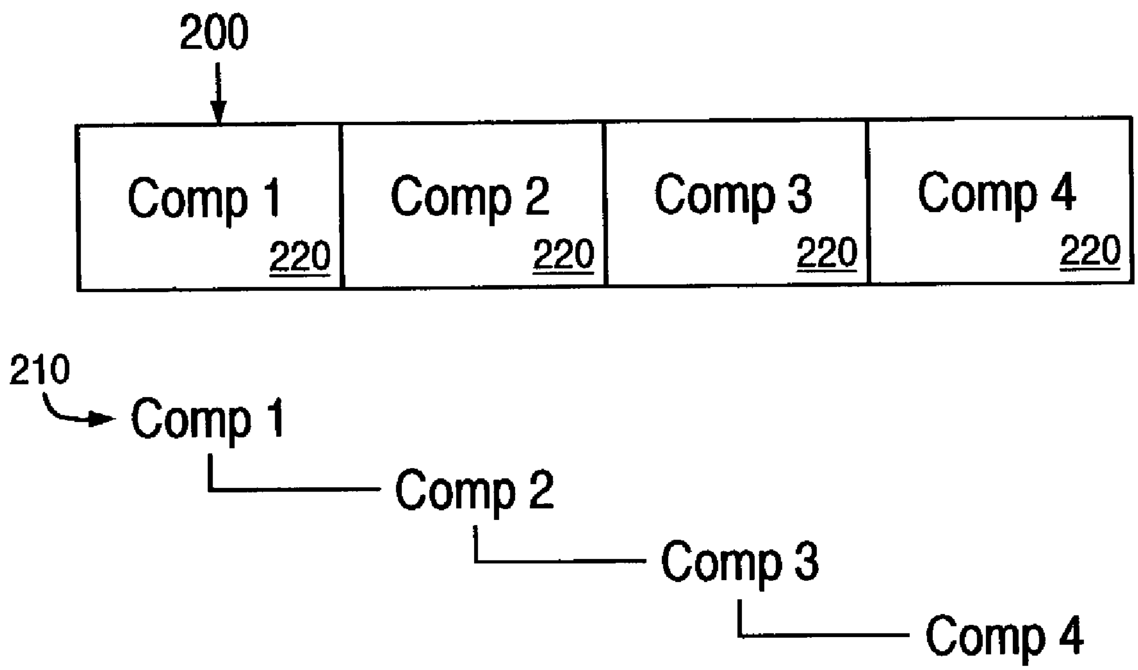
FIG. 2 is a diagram of a common key for manipulating data in an interface for providing component information, according to an embodiment of the present invention.

Referring now to FIG. 2, an embodiment of the present invention provides for a common key or unique identifier 200 that is used to identify where in the handoff structure 100 component information is located. The common key 200 is known by the program (e.g., SAL) that fills the handoff structure 100 and the program (e.g., ACPI) that consumes the information in the handoff structure 100. The common key 200 may be formed by concatenating a number of component identifiers 220. There may be one component identifier at each level 100. The component identifiers 220 may point to which component of a number of possible components. For example, in a system that has logical hierarchy of four levels of components, the common key may have four separate values for components. Thus, referring to the example in FIG. 1B, along with FIG. 2, a common key 200 of "7341" may identify the first slot entry 125*f* of the fourth LBA entry 125*e* of the third SBA entry 125*d* of the seventh cell entry 125*g*.

In some cases, there may be more than one component type at a given level 110, and hence additional information is needed to identify the component data. For example, if information is sought about a level two 110*b* component in the schema of FIG. 1B, then additional information is needed to know for which component type information is sought. Thus, in one embodiment, the ACPI receives information about what type of component information is sought. For example, the ACPI determines or is informed that serial device entry information is sought. Then, when the ACPI indexes the handoff structure with the common key 200, it also factors this in and selects the pertinent entry 125 in the serial device array 120.

Figure 3:
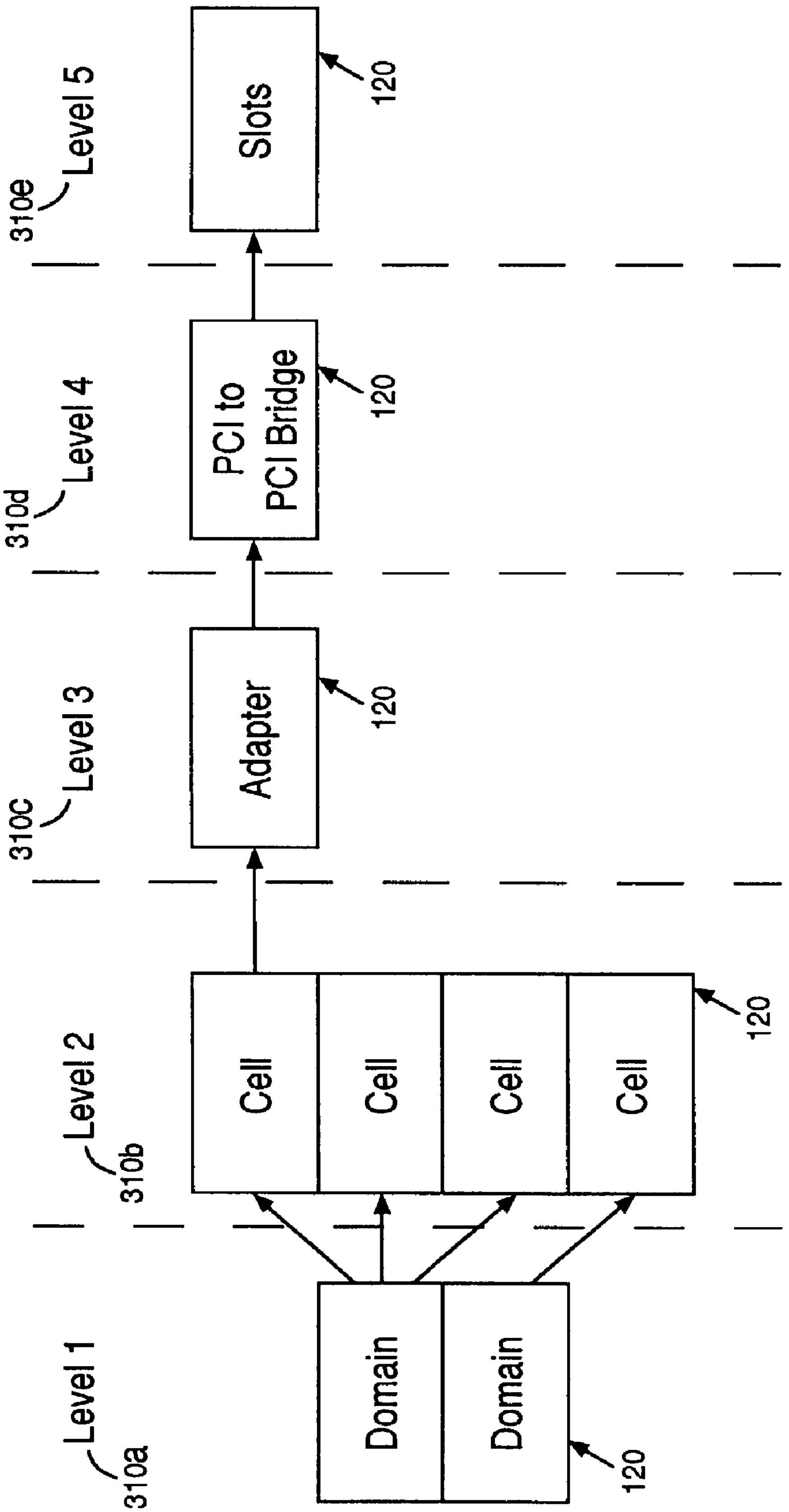
FIG. 3 is a diagram of a data structure for an interface for handing off component information, according to an embodiment of the present invention.

As discussed herein, the organization of FIG. 1B is exemplary. FIG. 3 illustrates another embodiment of a handoff structure 300 for handing off system information. In this embodiment, level one 310*a* comprises information regarding domains (e.g., an array 120 of domain information). For example, the system may support multiple operating systems, with each operating system having its own domain. Level two 310*b* may comprise information for cells of which there may be several depending on how the hardware is laid out. Level three 310*c* comprises adapter information. Level four 310*d* comprises PCI-to-PCI bridge information and level five 310*e* comprises slot information.

The common key 200 for the example of Figure may have five component values. For example, a common key of "23111" may refer to the first slot of the first PCI-to-PCI bridge of the first adapter of the third cell of the second domain.

Figure 1B:
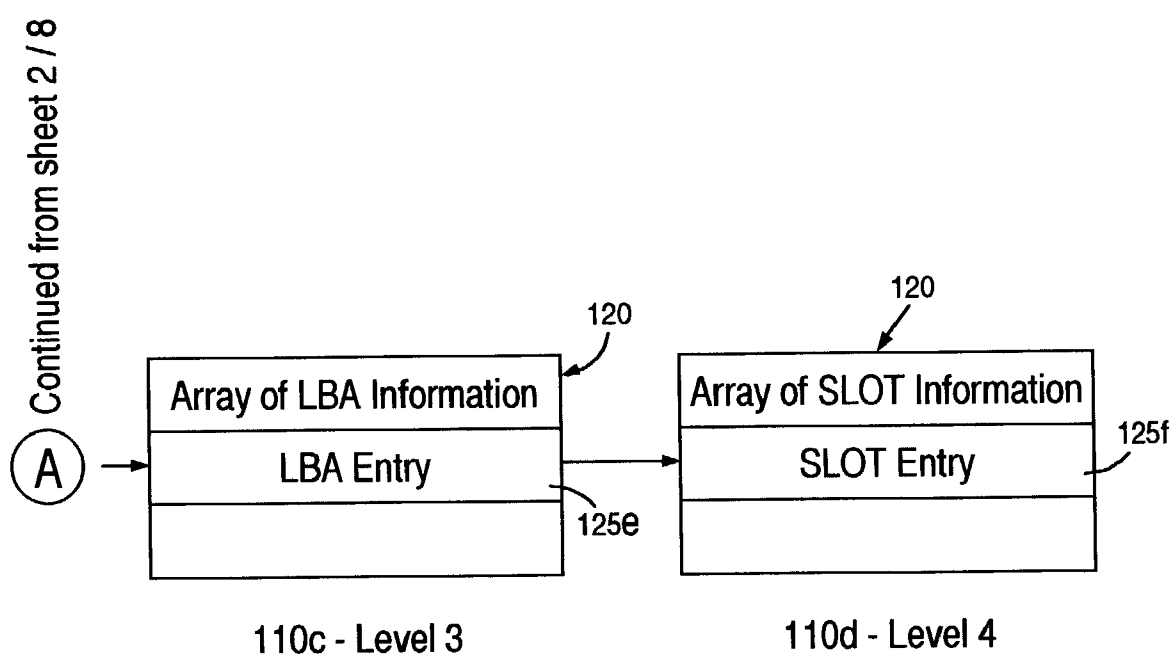

While FIGS. 1 and 3 depict a hierarchical schema, such a schema is not required. In one embodiment, the common key 200 provides a one-to-one mapping between the entries in the schema and the possible components in the system. This implies that every component in the computer system 150 will have a unique key associated with it.

Figure 4:
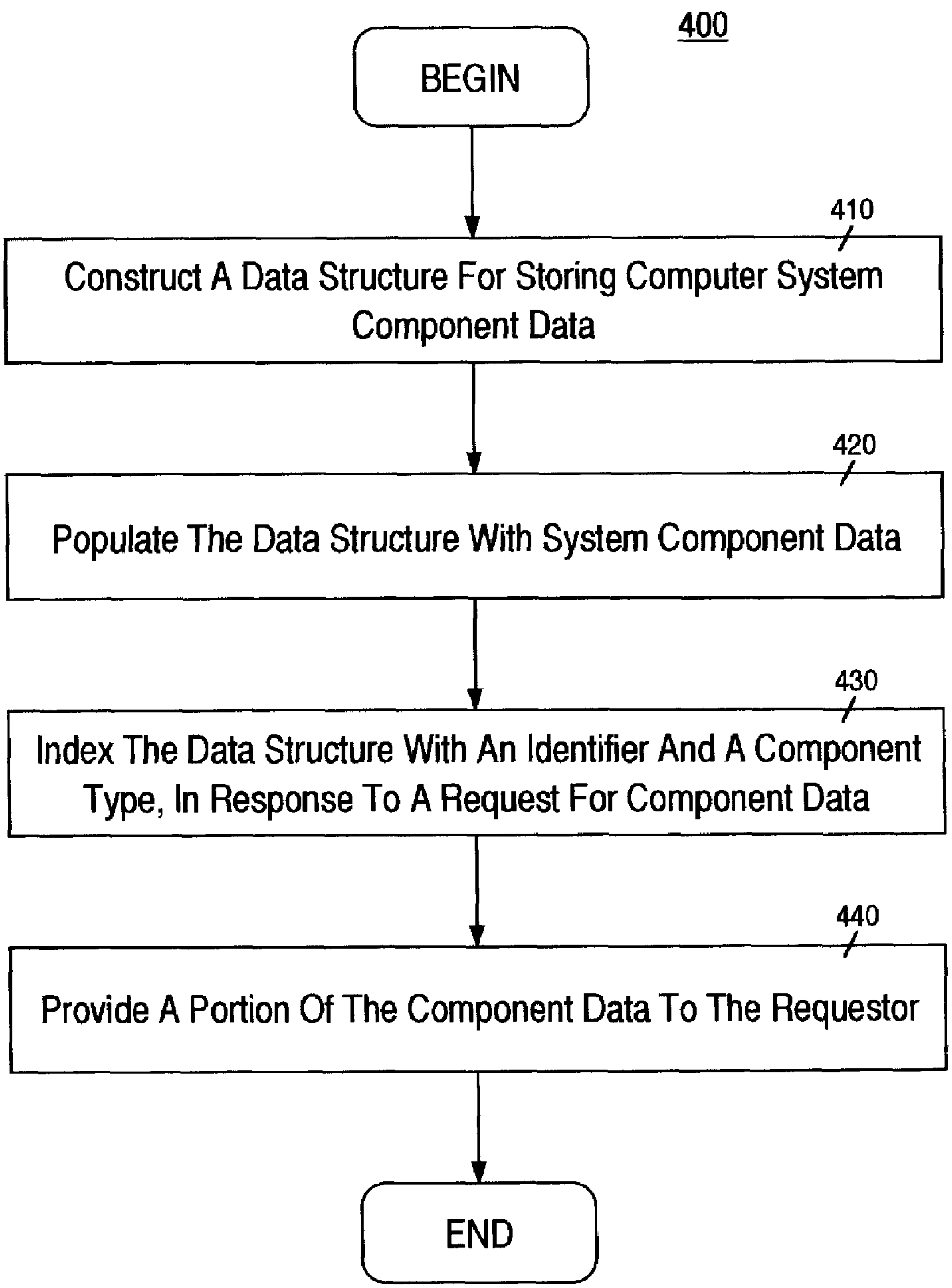
FIG. 4 is a flowchart illustrating steps of a process of providing component information, according to an embodiment of the present invention.

An embodiment of the present invention provides for a method of providing component data, using an interface between SAL and ACPI. Steps of process 400 of FIG. 4 may be stored as instructions on a computer readable medium and executed on a general-purpose processor. In step 410, a handoff structure 100, 300 that provides the interface is built. This may be constructed by SAL (e.g., system firmware) when the computer system is booted.

In step 420, the handoff structure 100, 300 is populated by SAL. SAL may take steps to discover system components and use the information gained to fill the handoff structure 100, 300. SAL may use a common key 200 to determine where to put the component data in the handoff structure 100, 300.

In step 430, the ACPI indexes the handoff structure 100, 300 to get component data. The ACPI may use the common key, as well as a component data type. For example, ACPI receives a call from the O/S, which may specify the type of component for which data is sought or may be a more general request for component data. In response, the ACPI constructs an appropriate common key 200 that will retrieve component data to fill the request from the O/S. This may involve indexing the handoff structure 100, 300 more than once.

In step 440, a portion of the component data from the handoff structure 100, 300 is provided to the requesting program, for the operating system. This step may involve the ACPI reformatting the component data to make it suitable for the request. For example, the request may be an "_CRS call," for which the data is expected to be returned according to a specified format.

Embodiments of the present invention allow the handoff structure 100, 300 to be placed virtually anywhere. Furthermore, the placement may be done when the system is booted. Therefore, both the size and the location of the handoff structure 100, 300 may be selected at bootup. This allows the ACPI code to be platform independent. Furthermore, the handoff structure 100, 300 may morph at runtime to support the given platform and system configuration. Thus, the exact configuration of the handoff structure 100, 300 will not be the always be the same. Embodiments may even construct a different handoff structure 100, 300 for the same computer system if the component configuration so dictates. For example, a given system might be manufactured with one, two, or three PCI busses. At bootup time the size and configuration of the handoff structure 100, 300 is adapted to the actual configuration. This avoids the need to provide multiple ACPI code solutions, as a conventional solution would require. Embodiments of the present invention also adapt to system component failures. For example, if a PCI bus fails at bootup up time, this will be correctly reported in the handoff structure 100, 300.

Figure 5:
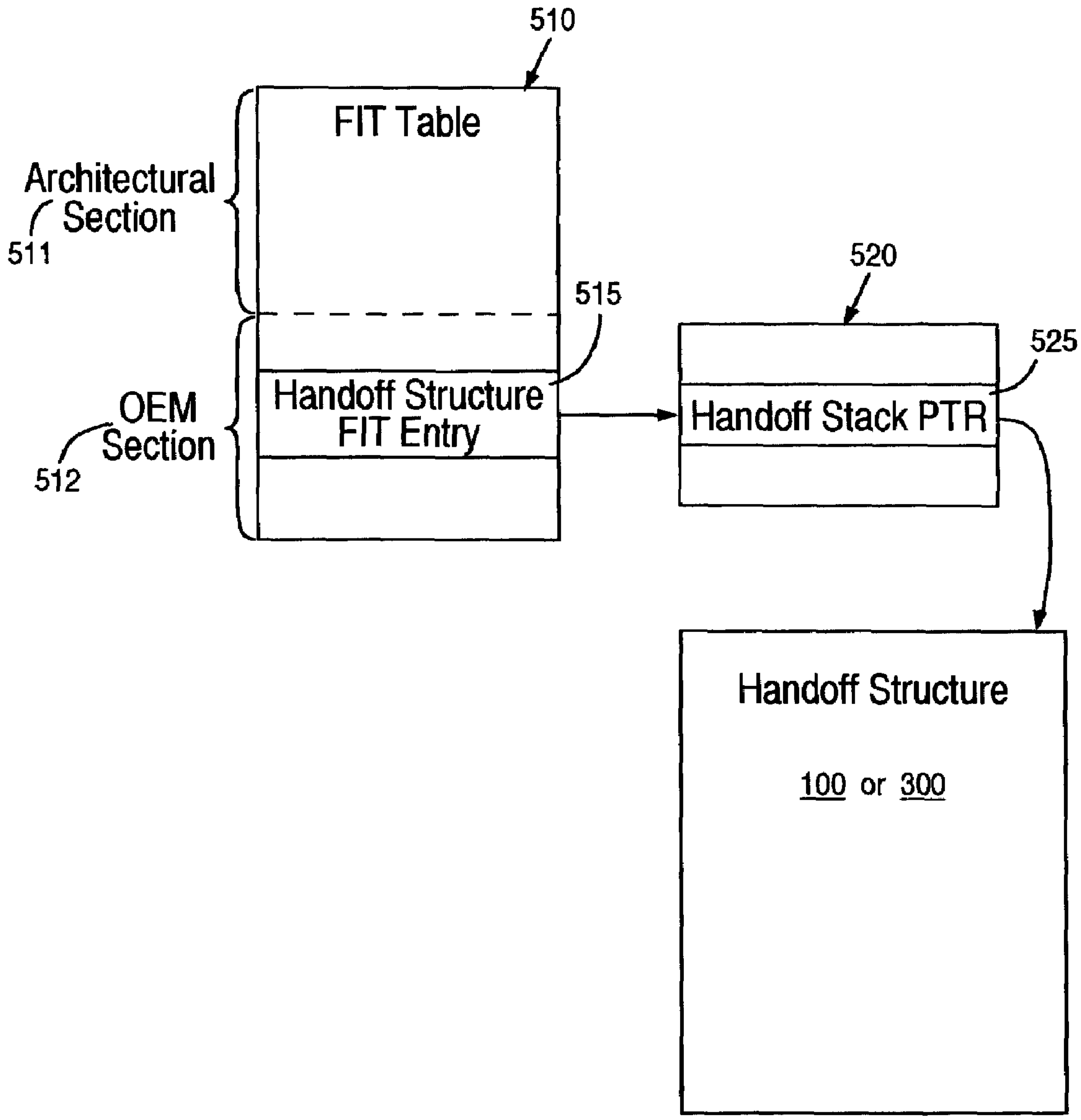
FIG. 5 is a diagram illustrating pointers to an interface for handing off component information, according to an embodiment of the present invention.

In order to provide maximum flexibility, the data structure 100, 300 may be located at any convenient location. Embodiments of the present invention provide a way for a first computer program (e.g., system firmware or SAL) to establish the location and to convey that location to a second computer program (e.g., an ACPI routine). Referring now to FIG. 5, a first pointer may be placed in a firmware interface table (FIT) 510. However, embodiments of the present invention are not limited to using a FIT 510. More generally, embodiments may use any architected location for providing a way to locate information (e.g., data or component information) on a system firmware ROM. It may be that the architected location is for storing pointers. For example, the pointers may point to data or component information. The FIT 510 may contain entries for different components in the system firmware. The FIT 510 may contain an architected section 511 for required components. The FIT 510 may also contain an original equipment manufacture (OEM) section 512, which may have fields related to optional components.

The handoff structure FIT entry 515, which may reside anywhere in the OEM section 512, points to a handoff structure pointer 525. The handoff structure pointer 525 resides in ACPI accessible memory 520. The handoff structure pointer 525 may be located anywhere that ACPI has access to later retrieve the pointer. For example, the handoff structure pointer 525 may be in main memory, scratch RAM (random access memory), non-volatile memory, etc. This flexibility allows the location of the handoff structure 100, 300 to be moved (e.g., to be established at system bootup) without re-writing any AML. This is because ACPI knows the location of the FIT 510 and may thus find the handoff structure FIT entry 515.

Figure 6:
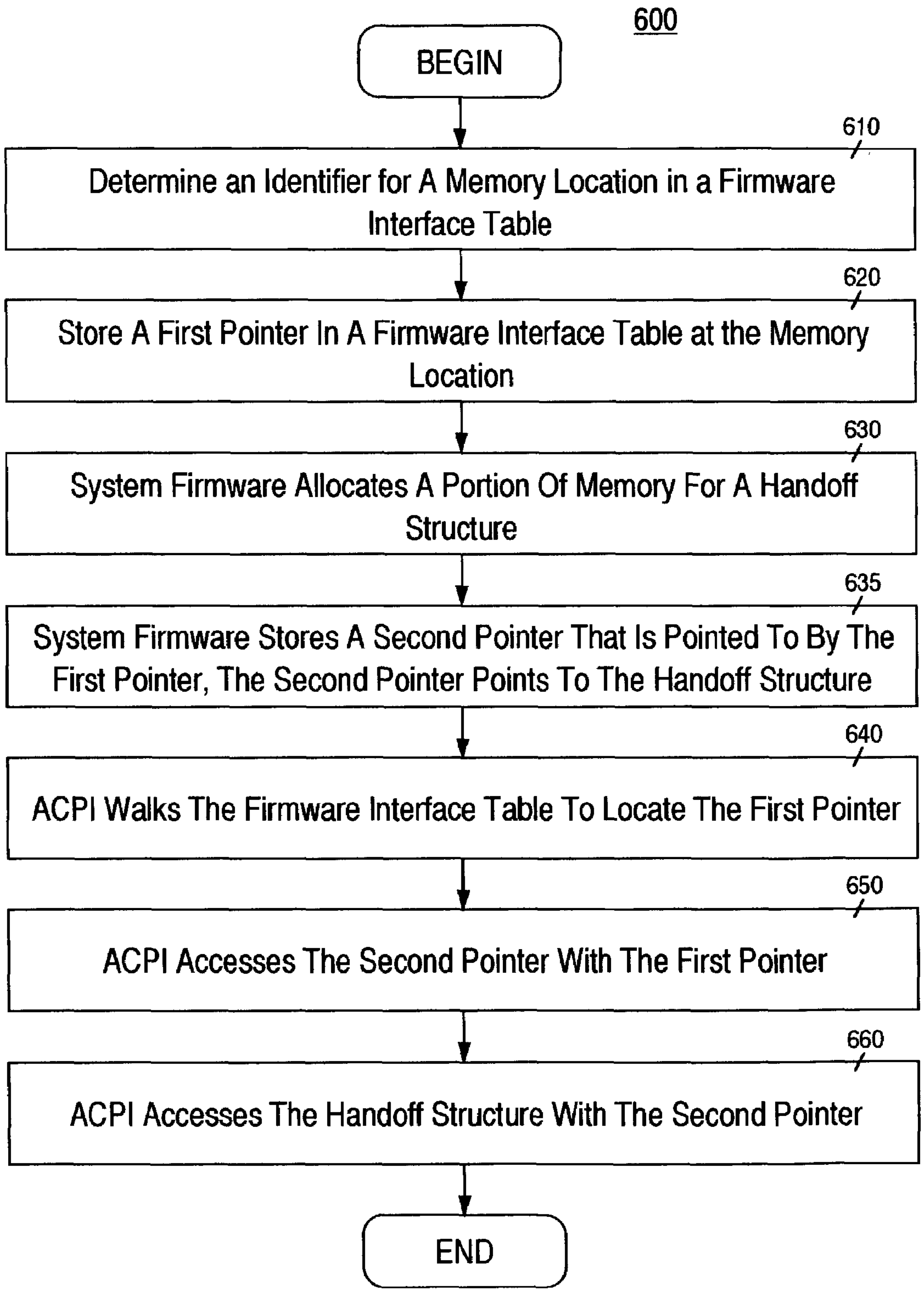
FIG. 6 is a flowchart illustrating steps of a process of setting up and using pointers to an interface for handing off component information, according to an embodiment of the present invention.

An embodiment of the present invention provides for a method of relaying the location of a handoff data structure 100, 300 and is illustrated in process 600 of FIG. 6. At least some steps of process 600 may be stored as instructions on a computer readable medium and executed on a general-purpose processor. In step 610, an identifier is determined for a memory location to which ACPI has access. For example, the identifier may be a component type and the memory location may be an entry in a FIT for the component type. In this fashion, ACPI will be able to locate the pointer when ACPI comes up.

In step 620, a first pointer (e.g., handoff structure FIT entry 515) is stored in a FIT 510. As the FIT may be implemented as a part of system ROM, this step may be performed as a part of a separate process of building the ROM.

In step 630, the system firmware allocates a portion of memory for a handoff structure 100, 300. This may be performed at system bootup, although the present invention is not so limited. The memory allocation may be anywhere to which both programs that interface with the handoff structure 100, 300 have access. For example, the system firmware may allocate main memory, scratch RAM, non-volatile memory, etc. The system firmware may then construct and fill the handoff structure 100, 300. For example, steps 410 and 420 of process 400 may be performed.

In step 635, system firmware stores a handoff structure pointer 525 at the location to which the pointer in the FIT 510 points. The handoff structure pointer 525 points to the handoff structure 100, 300.

When ACPI comes up, it is able to locate the handoff structure 100, 300 by accessing the pointers (510, 525). This may be accomplished by the ACPI code walking the FIT table 510 to locate the first pointer, in step 640. For example, the ACPI code may know that the handoff structure FIT entry 515 is in the OEM section 512 of the FIT 510 at the location for a field for a given component type. Any suitable component type may be chosen. If component type 51 is selected, then the ACPI code knows that that the handoff structure FIT entry 515 is at the field in the FIT 510 for component type 51.

In step 650, the ACPI code accesses the second pointer (e.g., handoff structure pointer 525) with the first pointer (e.g., handoff structure FIT entry 515). In this fashion, the ACPI determines the location of the handoff structure 100, 300 by starting at a pre-established position.

In step 660, the ACPI code accesses the handoff structure 100, 300 using the second pointer. Thus, embodiments of the present invention are able to provide a flexible location and size for the handoff structure 100, 300. Were the location of the handoff structure 100, 300 the same the handoff structure 100, 300 would lack flexibility.

While the present invention has been described in particular embodiments, it should be appreciated that the present invention should not be construed as limited by such embodiments, but rather construed according to the below claims.

We claim:

1. A method of providing a flexible data interface, comprising:

a) storing a first pointer in an architected location in a read only memory (ROM), wherein said first pointer is stored in a component type field of a firmware interface table;

b) allocating a portion of memory for a data structure that is an interface for handing off system component information; and c) system firmware storing a second pointer in a memory location pointed to by said first pointer, said second pointer pointing to said data structure, wherein said memory location is in random access memory.

2. The method of claim 1, wherein said system firmware stores said second pointer in said random access memory at system bootup.

3. The method of claim 1, further comprising:

d) walking said architected location to locate said first pointer;

e) accessing said second pointer with said first pointer; and f) accessing said data structure with said second pointer.

4. The method of claim 1, further comprising:

d) an advanced configuration and power (ACPI) program walking said architected location to locate said first pointer;

e) said ACPI program accessing said second pointer with said first pointer; and f) said ACPI program accessing said data structure with said second pointer.

5. The method of claim 1, wherein said data structure provides said interface between said system firmware and an advanced configuration and power interface.

6. A computer system comprising:

a first pointer stored in an original equipment manufacturer (OEM) section of a firmware interface table located in a read only memory; and a second pointer stored at a second memory location;

wherein said first pointer points to said second pointer; and wherein said second pointer points to a data structure in a third memory location and for information regarding components in said computer system, said data structure serving as a handoff interface between system firmware and an advanced configuration and power interface.

7. The computer system of claim 6, wherein said second memory location is in random access memory.

8. The computer system of claim 6, wherein said firmware interface table is substantially compliant with a firmware interface table in an I-64 architecture.

9. The computer system of claim 6, wherein said third memory location is main memory.

10. A method of passing a location of a data interface, comprising:

a) determining an identifier for a first memory location, wherein said first memory location is an architected location in a system firmware read only memory (ROM), wherein said identifier is a component type;

b) providing said identifier to an advanced configuration and power interface;

c) storing a first pointer in said first memory location;

d) system firmware storing a second pointer in a second memory location pointed to by said first pointer, wherein said second pointer points to a data structure that is for handing off system component information between said system firmware and said advanced configuration and power interface; and e) said advanced configuration and power interface retrieving said first pointer by accessing a field for said component type in a firmware interface table.

11. The method of claim 10, wherein said architected location is a firmware interface table.

12. The method of claim 11, wherein said first memory location is a component type field in an original equipment manufacturer (OEM) section of said firmware interface table.

13. The method of claim 10, further comprising:

said system firmware allocating a portion of memory for said data structure.

14. The method of claim 10, further comprising:

f) said advanced configuration and power interface retrieving said second pointer using said first pointer.

15. The method of claim 14, further comprising: g) said advanced configuration and power interface accessing said data structure using said second pointer.

16. A computer system comprising:

a first pointer stored in a firmware interface table that is substantially compliant with a firmware interface table in an I-64 architecture; and a second pointer stored at a second memory location;

wherein said first pointer points to said second pointer; and wherein said second pointer points to a data structure in a third memory location and for information regarding components in said computer system, said data structure serving as a handoff interface between system firmware and an advanced configuration and power interface.

17. The computer system of claim 16, wherein said first pointer is stored in an original equipment manufacturer (OEM) section of said firmware interface table.

18. The computer system of claim 16, wherein said first pointer is stored in read only memory.

* * * * *